United States Patent Office 3,317,548
Patented May 2, 1967

3,317,548
1-ALLYL-3-(SUBSTITUTED BENZOYL)-4-(SUBSTITUTED PHENYL)-4-HYDROXYPIPERIDINES
Marshall D. Draper, Woodland Hills, Calif., assignor to Rexall Drug and Chemical Company, Los Angeles, Calif., a corporation of Delaware
No Drawing. Filed Oct. 3, 1966, Ser. No. 583,954
5 Claims. (Cl. 260—294.7)

This application is a continuation-in-part of my application entitled, "Substituted 1-Lower Alkenyl-4-Hydroxypiperidines," Ser. No. 407,847, filed Oct. 30, 1964, and now abandoned which is a continuation-in-part of my application entitled "Substituted Piperidines," Ser. No. 319,596, filed Oct. 28, 1963, and now abandoned.

This invention relates to compositions of matter classified in the art of chemistry as substituted piperidines.

The invention sought to be patented resides in the concept of a chemical compound having a molecular structure in which there are attached to a 1-allyl-4-hydroxypiperidine nucleus a p-halo- or p-lower alkoxybenzoyl group at the 3-position and a p-halo- or p-lower alkoxyphenyl group at the 4-position.

As used throughout the specification and in the claims the term "lower alkoxy" embraces both straight and branched chain alkoxy radicals containing from 1 to 6 carbon atoms, for example, but without limitation, methoxy, ethoxy, n-propoxy, isopropoxy, n-butoxy, tert-butoxy, n-amyloxy, sec-amyloxy, n-hexyloxy, 2-ethylbutoxy, 2,3 - dimethylbutoxy and the like, the term "halo" embraces chloro, fluoro, bromo and iodo and the term "allyl" denotes a propenyl radical having the formula $-CH_2-CH=CH_2$ wherein the double bond is removed at least two carbon atoms from the point of attachment.

The tangible embodiments of this invention possess the inherent general physical characteristics of being, in the form of their acid-addition salts, solid crystalline materials. Spectral data and elemental analysis, taken together with the aforementioned physical properties, the nature of the starting materials and the mode of synthesis, positively confirm the structure of the compounds sought to be patented.

The tangible embodiments of this invention possess the inherent applied use characteristics of having significant pharmacological activity as central nervous system depressant, antipyretic, anti-inflammatory and anti-convulsant agents as determined by recognized and accepted pharmacological test procedures. In addition, these compounds are valuable chemical intermediates useful in organic chemical synthetic procedures. The reactive hydroxyl and carbonyl groups and the double bond in the allyl substituent at the 1-position of the piperidine ring or one of the hereinafter to be described lower alkenyl equivalents of said allyl substituent are all amenable to chemical reaction in a manner which will be apparent to one of normal skill in the art of chemistry.

The manner and process of making and using the invention will now be generally described so as to enable a person skilled in the art of chemistry to make and use the same as follows:

The reaction sequence leading to the tangible embodiments of this invention is illustrated as follows:

REACTION SEQUENCE

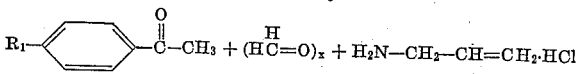

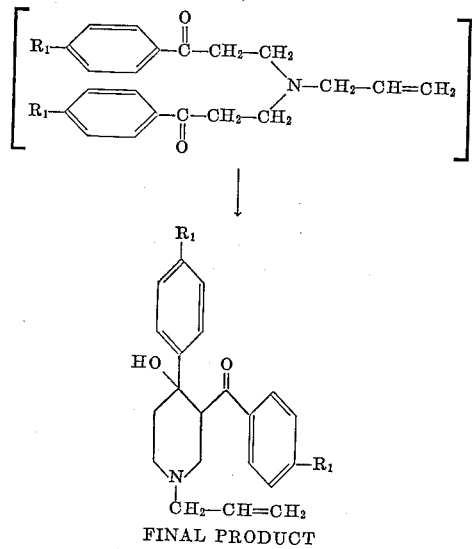

FINAL PRODUCT wherein $R_1$ is halo or lower alkoxy.

The starting materials for the preparation of the tangible embodiments of this invention by the reaction sequence depicted hereinabove are all known compounds that are readily available commercially. These starting materials are allyl amine, paraformaldehyde and an appropriately substituted acetophenone.

The starting materials are converted to the tangible embodiments of this invention by means of the well known Mannich reaction in the presence of either a base or an acid. In this Mannich reaction the conversion of the starting materials to product is completed directly, isolation of the bis-N-($\beta$-p-halobenzoylethyl)-N-allylamine and bis-N-($\beta$-p-lower alkoxybenzoylethyl)-N-allylamine intermediates being unnecessary. In the absence of solvent, however, the intermediates may be recovered, if desired, and then converted to the final product by treatment with base.

Substituted acetophenone starting materials having a halo or lower alkoxy substituent at other than the para position of the benzene ring as well as substituted acetophenone starting materials having two or three halo or lower alkoxy substituents on the benzene ring are the full equivalents of the specific p-substituted starting materials in the above described reaction sequence, thereby to form final products having one or more halo or lower alkoxy substituents at the same position or positions on the benzene rings as in the starting materials, such final products having the same utility as the specific para-substituted final products described above.

Similarly, lower alkenylamines containing from 4 to 6 carbon atoms wherein the double bond is at least two carbon atoms removed from the point of attachment of the amine radical are the full equivalents of the specific allylamine depicted in the above-described reaction sequence and may be substituted therefor. Their use results in the preparation of piperidine final products that bear correspondingly similar lower alkenyl substitution on the nitrogen atom wherein the double bond is at least two carbon atoms removed from the point of attachment, such final products having the same utility as the specific N-allylpiperidine final product and being included within the scope of this invention. For example 2-butenylamine (H$_2$N—CH$_2$CH=CH—CH$_3$)

yields the N-(2-butenyl)piperidine, 3-butenylamine (H$_2$N—CH$_2$—CH$_2$—CH=CH$_2$)

yields the N-(3-butenyl)piperidine, 2-butenyl-3-amine (H$_2$N—CH(CH$_3$)—CH=CH$_2$) yields the N-(2-buten-3-yl)piperidine, 2-methyl-3-butenyl (H$_2$N—CH$_2$—CH(CH$_3$)—CH=CH$_2$)

yields the N-(2-methyl-3-butenyl)-piperidine, 2-methyl-2-propenylamine (H$_2$N—CH$_2$—C(CH$_3$)=CH$_2$) yields the N-(2-methyl-3-propenyl)piperazine, 4-methyl-2-pentenylamine (H$_2$N—CH$_2$—CH=CH—CH(CH$_3$)—CH$_3$) yields the N - (4-methyl-2-pentenyl)piperazine, and 2 - hexenylamine (H$_2$N—CH$_2$—CH=CH—CH$_2$—CH$_2$—CH$_3$) yields the N-(2-hexenyl)piperidine.

The tangible embodiments of this invention can if desired, be converted into carboxylic acid esters by treatment with an appropriate carboxylic acid halide, for example, acetyl chloride, propionyl chloride, benzoyl chloride and the like. Such esters are the full equivalents of the unesterified substituted 4-hydroxy-piperidine compounds comprising the tangible embodiments of this invention and are included within the scope of this invention.

The tangible embodiments of this invention and their equivalent esters can, if desired, be converted into their non-toxic pharmaceutically acceptable acid-addition and quaternary ammonium salts. Salts which may be formed comprise, for example, salts with inorganic acids, such as the hydrochloride, hydrobromide, hydroiodide, sulfate, phosphate or the like. They may also comprise salts with organic acids, including monobasic acids such as the acetate or the propionate, and especially those with hydroxy organic acids and dibasic acids, such as citrate, tartrate, malate, maleate and fumarate. Pharmaceutically, the salt will not be substantially more toxic than the compound itself and, to be acceptable, it should be able to be incorporated into conventional liquid or solid pharmaceutical media. Among the useful quaternary ammonium salts are those formed by such alkyl halides as methyl iodide, n-hexyl bromide and the like. Such pharmaceutically useful acid-addition and quaternary ammonium salts are the full equivalents of the bases from which they are derived and are included within the scope of this invention.

The tangible embodiments of this invention, either as free bases or in the form of a non-toxic pharmaceutically acceptable acid-addition or quaternary ammonium salt, can be combined with conventional pharmaceutical diluents and carriers, to form such dosage forms as tablets, suspensions, solutions, suppositories and the like.

The best mode contemplated by the inventor for carrying out their invention will now be set forth as follows:

The following examples are illustrative of embodiments of this invention wherein the benzene rings are monosubstituted:

EXAMPLE 1

*1-allyl-3-(p-methoxybenzoyl)-4-hydroxy-4-(p-methoxyphenyl)piperidine*

Dissolve allylamine (28.6 g.) in anhydrous ether (200 ml.) and bubble in anhydrous hydrogen chloride gas until precipitation of the hydrochloride salt of allylamine is complete. Recover the salt, wash it with ether, dry and then add to a mixture of absolute ethanol (60 ml.), benzene (80 ml.), p-methoxyacetophenone (200 g., 1.3 moles) and paraformaldehyde (33 g., 1.1 moles). Collect the aqueous layer in an azeotrope trap and reflux the mixture until the evolution of water is quite slow. Add concentrated hydrochloric acid (2 ml.) to the mixture and additional paraformaldehyde (5 g.). Continue to reflux for about two hours and then again add paraformaldehyde (5 g.). Cool the reaction mixture and allow to stand for 48 hours. Recover the crystalline material, which settles out, by filtration to a yield of 80 g. (36.5%), M.P. 173°–174° C., the hydrochloride salt of the product.

*Analysis.*—Calculated for C$_{23}$H$_{28}$NO$_4$Cl: C, 66.09%; H, 6.75%; N, 3.35%. Found: C, 66.04%; H, 6.71%; N, 3.36%.

EXAMPLE 2

*1-allyl-3-(methoxybenzoyl)-4-propionyloxy-4-(p-methoxyphenyl)piperidine*

Dissolve 1-allyl-3-(p-methoxybenzoyl)-4-hydroxy-4-(p-methoxyphenyl)piperidine (10 g., 0.026 mole), prepared as described in Example 1, in pyridine (50 ml.) and add an ether (25 ml.) solution of propionyl chloride (5 g.). Reflux the mixture for 1 hour and then pour into water (750 ml.). Extract the mixture twice with ether, add a few ml. of 50% sodium hydroxide to the aqueous mixture and again extract with ether. Evaporate the combined ether extracts (1000 ml.) in vacuo. Recover the product from the red oil (16 g.), which results from the evaporation of the ether extracts, in the form of its oxalate salt in a yield of 10 g. (88%), M.P. 174°–175° C.

*Analysis.*—Calculated for C$_{28}$H$_{33}$NO$_9$: C, 63.75%; H, 6.30%; N, 2.65%. Found: C, 63.64%: H, 6.44%; N, 2.65%.

EXAMPLE 3

*1-allyl-3-(p-chlorobenzoyl)-4-hydroxy-4-(p-chlorophenyl)piperidine*

Treat p-chloroacetophenone, paraformaldehyde and allylamine hydrochloride (molar proportions as set forth in Example 1) by the Mannich reaction in the absence of solvent to form bis-N-(β-p-chlorobenzoylethyl)-N-allylamine hydrochloride. To 70 g. (0.165 mole) of this compound, add dropwise sodium hydroxide solution (25 g. of 50% aqueous sodium hydroxide diluted with 900 ml. water) at 55° C. Stir the colorless oil for 1½ hours at 50–60° C. Cool the solution to room temperature, separate the oil and wash. Add dilute hydrochloric acid to the washed oil, recover the precipitate and wash with water. Recrystallize from methanol/chloroform to yield 56 g. (79.5%), M.P. 204° C. of the hydrochloride salt of the product.

*Analysis.*—Calculated for C$_{21}$H$_{22}$NO$_2$Cl$_3$: C, 59.20%; H, 5.20%; N, 3.29%; Cl, 24.95%. Found: C, 59.08%; H, 5.13%; N, 3.32%; Cl, 24.81%.

The following example is illustrative of embodiments of this invention wherein the benzene rings are polysubstituted.

EXAMPLE 4

*1-allyl-3-(3',4',5'-trimethoxybenzoyl)-4-hydroxy-4-(3',4',5'-trimethoxyphenyl)piperidine*

The product is obtained by the procedure described in Example 1, without isolation of the intermediate Mannich base, by the reaction of 3,4,5-trimethoxyacetophenone, paraformaldehyde and allylamine hydrochloride. Yield is 38.5 g. (34.2%), M.P. 158°–161° C. of the hydrochloride salt.

*Analysis.*—Calculated for C$_{27}$H$_{36}$NO$_8$Cl: C, 60.30%; H, 6.75%; N, 2.61%. Found: C, 60.27%; H, 6.92%; N, 2.69%.

The subject matter which the applicant regards as his invention is particularly pointed out and distinctly claimed as follows:

1. 1-Allyl-3-(p-lower alkoxybenzoyl)-4-hydroxy-4-(p-lower alkoxyphenyl)piperidine.

2. 1-Allyl-3-(p-halobenzoyl)-4-hydroxy-4-(p-halophenyl)-piperidine.

3. 1 - Allyl - 3 - (p-methoxybenzoyl)-4-hydroxy-4-(p-methoxyphenyl)piperidine.

4. 1-Allyl-3-(p-chlorobenzoyl)-4-hydroxy-4-(p-chlorophenyl)piperidine.

5. 1-Allyl-3-(3′,4′,5′-trimethoxybenzoyl)-4-hydroxy-4-(3′,4′,5′-trimethoxyphenyl)piperidine.

References Cited by the Examiner

UNITED STATES PATENTS

| | | | |
|---|---|---|---|
| 2,489,669 | 11/1949 | Plati et al. | 260—294.75 |
| 2,765,314 | 10/1956 | Schmidle et al. | 260—294.3 |
| 3,043,845 | 7/1962 | Zaugg et al. | 260—294.75 |

FOREIGN PATENTS 553,401  12/1956  Belgium.

OTHER REFERENCES

Plati et al.: J. Org. Chem., vol. 14, pp. 873–878 (1949).

WALTER A. MODANCE, *Primary Examiner.*

AVROM D. SPEVACK, *Assistant Examiner.*